(12) United States Patent
Kikuchi

(10) Patent No.: US 9,369,848 B2
(45) Date of Patent: Jun. 14, 2016

(54) INFORMATION DISTRIBUTION APPARATUS, INFORMATION DISTRIBUTION METHOD AND PROGRAM

(71) Applicant: NTT DOCOMO, INC., Tokyo (JP)

(72) Inventor: Daisuke Kikuchi, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 65 days.

(21) Appl. No.: 14/356,417

(22) PCT Filed: Nov. 9, 2012

(86) PCT No.: PCT/JP2012/079137
§ 371 (c)(1),
(2) Date: May 6, 2014

(87) PCT Pub. No.: WO2013/073474
PCT Pub. Date: May 23, 2013

(65) Prior Publication Data
US 2015/0181395 A1    Jun. 25, 2015

(30) Foreign Application Priority Data
Nov. 14, 2011    (JP) .................... 2011-248543

(51) Int. Cl.
*H04H 20/71*    (2008.01)
*H04W 4/08*    (2009.01)
*H04W 72/04*    (2009.01)

(52) U.S. Cl.
CPC .............. *H04W 4/08* (2013.01); *H04W 72/042* (2013.01)

(58) Field of Classification Search
USPC ........... 370/312–329, 331–338; 709/220–229
See application file for complete search history.

(56) References Cited

U.S. PATENT DOCUMENTS

| | | | |
|---|---|---|---|
| 7,181,507 B1* | 2/2007 | Lavelle | H04W 12/08 707/999.01 |
| 2004/0030787 A1* | 2/2004 | Jandel | H04L 12/1813 709/229 |

(Continued)

FOREIGN PATENT DOCUMENTS

| | | |
|---|---|---|
| JP | 2003-1345456 | 9/2003 |
| JP | 2006260064 A | 9/2006 |
| JP | 2008140246 A | 6/2008 |

OTHER PUBLICATIONS

PCT International Search Report issued in International Application No. PCT/JP2012/079137, date mailed Dec. 25, 2012, pp. 1-2.

(Continued)

*Primary Examiner* — Man Phan
(74) *Attorney, Agent, or Firm* — MKG, LLC

(57) ABSTRACT

To assist communication by users, who are associated according to their location. Each of APs (Access Points) $300_1$ to $300_m$ is installed at a certain place, and sends a radio signal including identification data. Each of wireless terminals $400_1$ to $400_n$, when receiving a radio signal, transmits send data including identification data to information distribution apparatus 100. Information distribution apparatus 100 classifies wireless terminals $400_1$ to $400_n$ into groups based on pieces of identification data, and realizes communication between users belonging to a group. Each group is associated with a particular place.

10 Claims, 6 Drawing Sheets

(56) References Cited

U.S. PATENT DOCUMENTS

| | | |
|---|---|---|
| 2009/0080361 A1 | 3/2009 | Song et al. |
| 2009/0219888 A1* | 9/2009 | Chen ................ H04W 64/00 370/331 |
| 2011/0053648 A1* | 3/2011 | Gustaf ................ H01Q 1/2258 455/562.1 |
| 2011/0143757 A1 | 6/2011 | Oh et al. |
| 2012/0243520 A1* | 9/2012 | Lee ...................... H04W 48/20 370/338 |
| 2013/0182652 A1* | 7/2013 | Tong ................ H04W 72/0446 370/329 |
| 2014/0351351 A1* | 11/2014 | Yu .......................... H04L 51/32 709/206 |

OTHER PUBLICATIONS

Notification of Reasons for Refusal for Japanese Patent Application No. 2013-544247, dated Dec. 16, 2015.

European Search Report issued in corresponding EP Application No. 12849011.7-1953, dated Aug. 6, 2015, pp. 1-5.

* cited by examiner

| IDENTIFICATION DATA | DATE AND TIME DATA | PLACE DATA | LOCATION DATA |
|---|---|---|---|
| AP 1 | 2011.11.22 | W CONCERT | E139.44... N35.39.... |
| | 2011.11.23 | X CONCERT | |
| AP 2 | 2011.11.22 | Y EXHIBITION HALL | E139.43... N35..38... |
| AP 3 | 2011.11.23 | Z STADIUM | E139.45... N35.40... |
| ... | ... | ... | ... |

INFORMATION DISTRIBUTION APPARATUS, INFORMATION DISTRIBUTION METHOD AND PROGRAM

TECHNICAL FIELD

The present invention relates to a technique for distributing information to a user of a wireless terminal.

BACKGROUND

Generally, a social networking service (SNS) is a service for linking users based on existing relations between friends or relatives. In a SNS, a user tends to communicate with another user dependent on existing relations (see, for example, JP2008-140246A).

However, communication based on existing relations has some disadvantages. For example, past actions in a SNS such as making a comment or posting information (especially, information a user may not wish others to become aware of) may be accessible to another user with whom the user has existing relations. Relations between users tend to continue until one of the users ends the relations.

In addition, some users may wish to have an opportunity to meet people with whom they are not acquainted. However, if people who are not acquainted with each other have little in common it may be difficult for such people to communicate effectively.

SUMMARY

It is an object of the present invention to assist communication between users, by linking users based on their location.

An information distribution apparatus according to an aspect of the present invention comprises: a receiving unit that receives identification data from each of a plurality of wireless terminals that have received a radio signal transmitted from one of a plurality of wireless devices, the plurality of wireless devices being installed at specified locations, and the received identification data being unique to the one of the plurality of wireless devices from which the wireless terminals have received a radio signal; a classifying unit that classifies the plurality of wireless terminals into groups based on identification data received by the receiving unit, the groups being formed of a plurality of wireless terminals that have received a radio signal from a same wireless device; and a distributing unit that distributes distribution data to a wireless terminal classified into a group by the classifying unit, the distribution data corresponding to the group.

In a preferred embodiment, the distributing unit distributes distribution data to a wireless terminal classified into a group by the classifying unit, the distribution data corresponding to the group, while the wireless terminal receives a radio signal from a wireless device corresponding to the group.

In another preferred embodiment, the receiving unit further receives location data indicative of a location of the wireless terminal, and the distributing unit distributes distribution data with a predetermined restriction to one of the plural wireless terminals classified into groups by the classifying unit, the distribution data corresponding to a group into which the wireless terminal has been classified, when a location of the wireless terminal indicated by location data received by the receiving unit is not within a predetermined area including a location where the wireless device corresponding to the group is installed.

In a further preferred embodiment, the distributing unit distributes distribution data to a wireless terminal classified into a group by the classifying unit, the wireless terminal currently receiving a radio signal, the distribution data corresponding to the group, and the distributing unit distributes distribution data with a predetermined restriction to a wireless terminal classified into the group by the classifying unit, the wireless terminal having previously received a radio signal and not currently receiving a radio signal, the distribution data corresponding to the group.

In a further preferred embodiment, the classifying unit classifies the plural wireless terminals into different groups when dates and times at which the plural wireless terminals receive a radio signal are different, even if the plural wireless terminals have received a same radio signal.

In a further preferred embodiment, the receiving unit further receives a message submitted by a user of the wireless terminal, and the distributing unit includes the message received from the wireless terminal in the distribution data corresponding to a group to which the wireless terminal belongs.

In a further preferred embodiment, the distributing unit distributes the message with a time lag set by the user who has submitted the message or with a predetermined time lag.

An information distribution method according to another aspect of the present invention comprises: a first step of receiving identification data from each of a plurality of wireless terminals that have received a radio signal transmitted from one of a plurality of wireless devices, the plurality of wireless devices being installed at specified locations, and the received identification data being unique to the one of the plurality of wireless devices from which the wireless terminals have received a radio signal; a second step of classifying the plurality of wireless terminals into groups based on identification data received by the receiving unit, the groups being formed of a plurality of wireless terminals that have received a radio signal from a same wireless device; and a third step of distributing distribution data to a wireless terminal classified into a group in the second step, the distribution data corresponding to the group.

A program according to another aspect of the present invention causes a computer to execute: a first step of receiving identification data from each of a plurality of wireless terminals that have received a radio signal transmitted from one of a plurality of wireless devices, the plurality of wireless devices being installed at specified locations, and the received identification data being unique to the one of the plurality of wireless devices from which the wireless terminals have received a radio signal; a second step of classifying the plurality of wireless terminals into groups based on identification data received by the receiving unit, the groups being formed of a plurality of wireless terminals that have received a radio signal from a same wireless device; and a third step of distributing distribution data to a wireless terminal classified into a group in the second step, the distribution data corresponding to the group.

According to the present invention, it is possible to assist communication between users, by linking users based on location.

DETAILED DESCRIPTION

Embodiment

Figure 1:
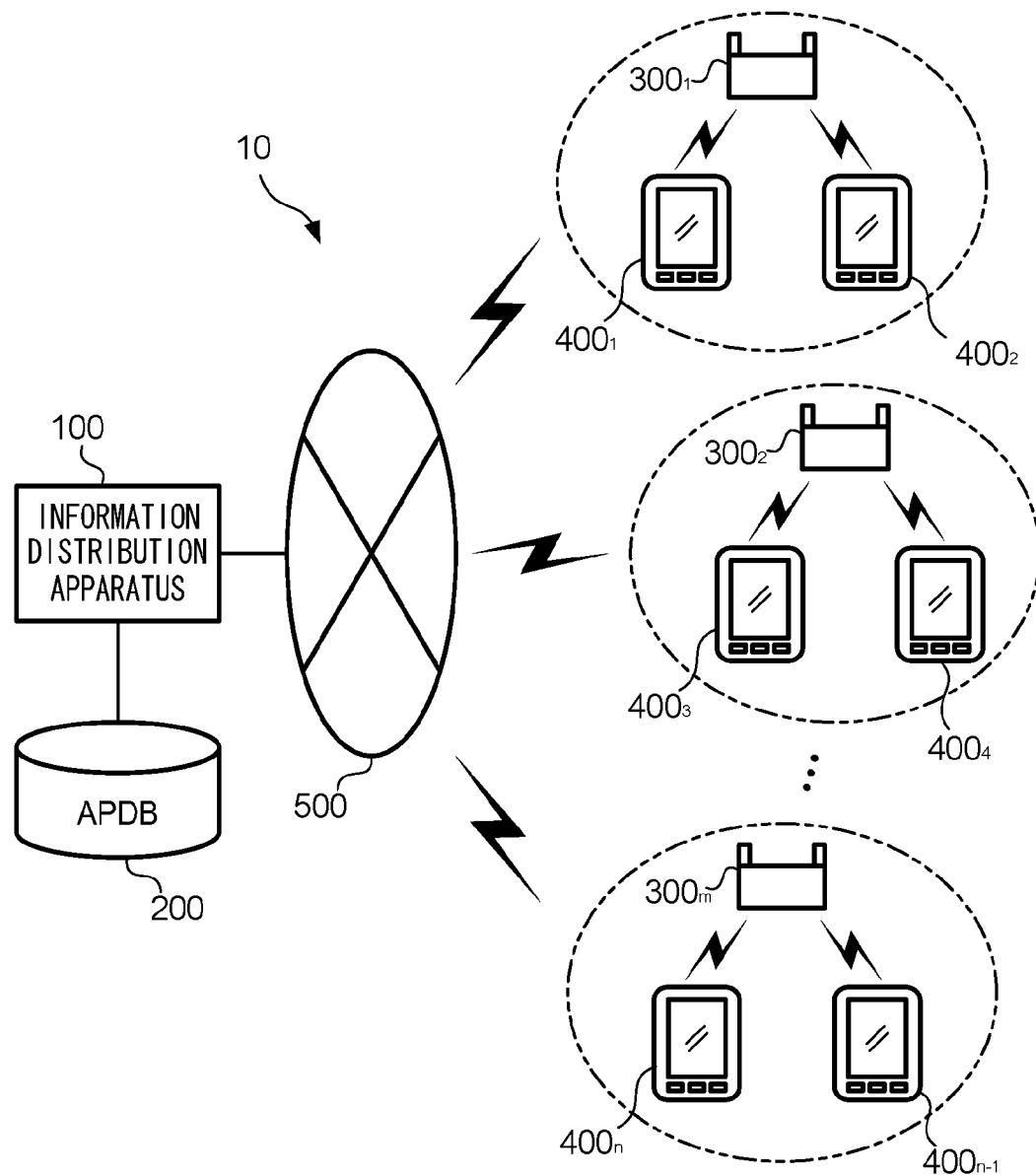
FIG. 1 is a diagram showing a configuration of an information distribution system.

FIG. 1 is a diagram showing a configuration of information distribution system 10, which is an embodiment of the present invention. As shown in FIG. 1, information distribution system 10 includes information distribution apparatus 100, access point database (hereinafter referred to as "APDB") 200, access points (hereinafter referred to as "APs") $300_1$, $300_2$, ... $300_m$, wireless terminals $400_1$, $400_2$, ... $400_n$ and network 500. The values m and n each may be any number.

APs $300_1$ to $300_m$ denote radio equipment, each component of which is installed at a predetermined place. APs $300_1$ to $300_m$ are, in the present embodiment, access points of a wireless LAN (Local Area Network). APs $300_1$ to $300_m$ are installed, for example, at a place where a variety of events (concerts, exhibitions, or sporting events) are held. APs $300_1$ to $300_m$ each may be installed at a fixed place, or may be movable and installed only when an event is held. Each of APs $300_1$ to $300_m$ sends a radio signal including identification data of the AP. The identification data is a character string, numeric values, or a combination thereof, which are unique to the AP. The identification data enables not only identification of an access point, but also identification of a place of installation of the access point.

Wireless terminals $400_1$ to $400_n$ are communication terminals used by users for participating in a community. A community is a group formed by association of users based on location. Wireless terminals $400_1$ to $400_n$ are, for example, mobile phones (including smartphones), tablet terminals, handheld game devices, or electronic book readers. Wireless terminals $400_1$ to $400_n$ are capable of communicating with information distribution apparatus 100 via network 500, and of wirelessly communicating with APs $300_1$ to $300_m$ via a wireless LAN.

APs $300_1$ to $300_m$ are installed at different places; however, their essential hardware configurations are the same. Accordingly, in the following description, APs $300_1$ to $300_m$ will be referred to as "AP 300" collectively, except in a case that it is necessary make a more specific reference. Similarly, since essential hardware configurations of wireless terminals $400_1$ to $400_n$ are the same, they will be referred to as "wireless terminal 400," except in a case that it is necessary to make a more specific reference.

Information distribution apparatus 100 is a computer that provides a service of sending community-based information as distribution data. Distribution data is information related to a place at which AP 300 is installed. Distribution data may include, in addition to location-specific information, common information (for example, news) that is distributed at different locations. Information distribution apparatus 100 is configured to acquire data from APDB 200. Information distribution apparatus 100 is also capable of identifying each of wireless terminals $400_1$ to $400_n$ in a known reliable manner.

APDB 200 is a database in which an association of an access point and a place of installation of the access point is described. Specifically, APDB 200 stores identification data included in a radio signal transmitted from AP 300, and place data for identifying a place, in association with each other. Place data may be a name of a place, a name of a facility, a name of an event held at the place, or a combination of any two or more thereof. Place data may change depending on a date and time if a place is the same, such as in a case that, in a multi-use facility, a concert is held at a given date and time, and an exhibition of electronic devices is held at a different given date and time. It is to be noted that APDB 200 may be a part of information distribution apparatus 100.

Figures 2, 3:
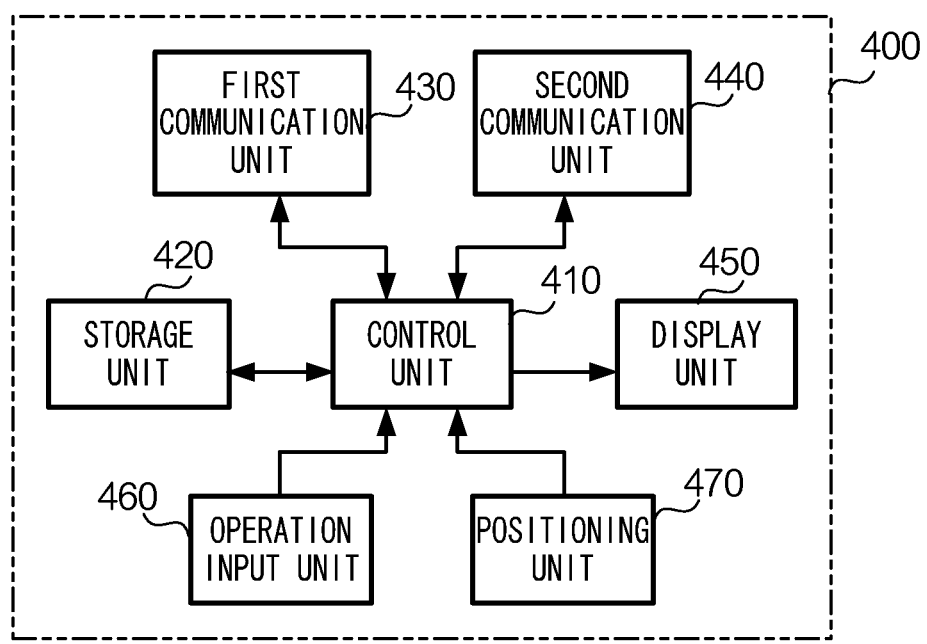
FIG. 2 is a diagram showing a data structure of an APDB.
FIG. 3 is a block diagram showing a hardware configuration of a wireless terminal.

FIG. 2 is a diagram showing a data structure of APDB 200. APDB 200 stores identification data, date and time data, place data, and location data in association with each other. Date and time data is data for specifying a time period of an event. Date and time data includes, for example, a starting date and time and an ending date and time. Location data is data indicative of a representative location of a place indicated by place data. In the present embodiment, location data indicates a latitude and longitude of the place. It is to be noted that date and time data and location data are not essential for implementation of the present invention.

In APDB 200, two or more pieces of identification data (namely, APs 300) may be associated with a single item of place data. For example, in a case where a place at which an event is held comprises plural sections, or is vast, two or more items of identification data may be associated with a single item of place data.

It is preferable that data of APDB 200 be updated at a proper timing each time a new event is organized.

Network 500 is a network for realizing communication between wireless terminal 400 and information distribution apparatus 100. Network 500 includes at least a wireless communication network (for example, a mobile communication network) for communication by wireless terminal 400. Network 500 may be a complex network comprising the wireless communication network and another communication network (for example, the Internet).

FIG. 3 is a block diagram showing a hardware configuration of wireless terminal 400. Wireless terminal 400 includes at least control unit 410, storage unit 420, first communication unit 430, second communication unit 440, display unit 450, operation input unit 460, and positioning unit 470. Wireless terminal 400 may include, in addition to the components, a speaker, a microphone, a digital camera, and an acceleration sensor. Wireless terminal 400 has a clock function; namely, a function of tracking date and time.

Control unit 410 controls operations of components of wireless terminal 400. Control unit 410 includes a processor such as a CPU (Central Processing Unit) and a memory such as a ROM (Read Only Memory) or a RAM (Random Access Memory). Control unit 410 executes a program to control operations of components.

Storage unit 420 stores data. Storage unit 420 consists of a flash memory or a hard disk. Storage unit 420 is capable of storing data necessary for control unit 410 to perform processing procedures. Specifically, storage unit 420 is capable of storing data on a history of communications with APs 300 and program.

First communication unit 430 communicates with AP 300 via a wireless LAN. Second communication unit 440 communicates via network 500. In the present embodiment, first communication unit 430 and second communication unit 440 are communication interfaces employing different communication systems.

Display unit 450 displays an image. Display unit 450 includes, for example, a display panel with liquid crystal elements or organic EL (electroluminescence) elements, and a drive circuit for driving elements (namely, pixels) of the display panel.

Operation input unit 460 receives an operation performed by a user. Operation input unit 460 may consist of keys or buttons, or a touch screen disposed on the display panel of display unit 450. Operation input unit 460 provides operation data to control unit 410, which is indicative of an input operation performed by a user.

Positioning unit 470 acquires location data. Location data is data indicative of a location of wireless terminal 400. Location data is represented by, for example, coordinates of latitude and longitude. Positioning unit 470 acquires location data using a GPS (Global Positioning System). Positioning unit 470 may use an A (Assisted)-GPS, which uses network 500 to acquire location data.

Figure 4:
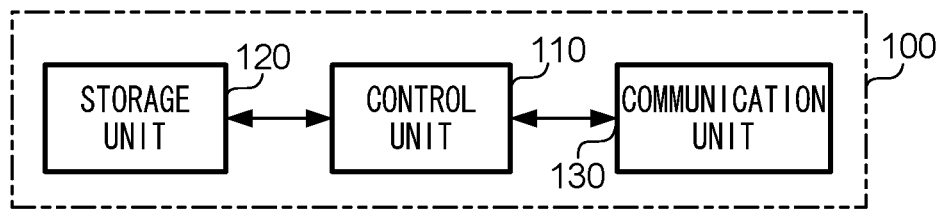
FIG. 4 is a block diagram showing a hardware configuration of an information distribution apparatus.

FIG. 4 is a block diagram showing a hardware configuration of information distribution apparatus 100. Information distribution apparatus 100 includes control unit 110, storage unit 120, and communication unit 130. Control unit 110 controls operations of information distribution apparatus 100. Control unit 110 includes a processor and a memory, and executes a program to control operations of components. Storage unit 120 stores data, and includes a storage medium such as a hard disk. Storage unit 120 is capable of storing distribution data. Communication unit 130 communicates via network 500. Communication unit 130 receives send data and distributes distribution data, and corresponds to a receiving unit and a distributing unit of the present invention.

Figure 5:
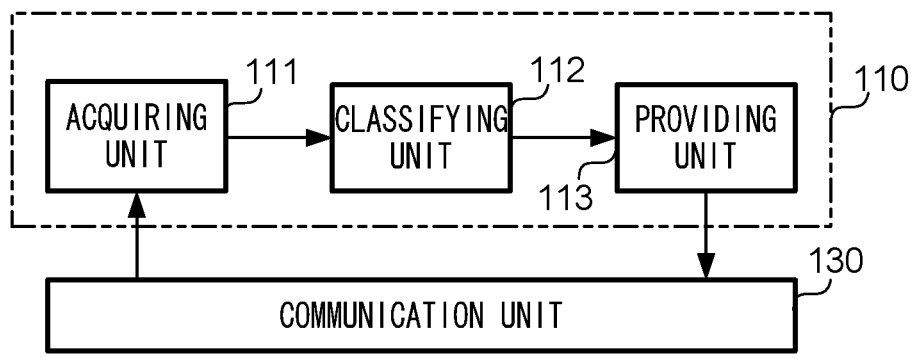
FIG. 5 is a block diagram showing a functional configuration of a control unit of an information distribution apparatus.

FIG. 5 is a block diagram showing a functional configuration of control unit 110. Control unit 110 provides functions of acquiring unit 111, classifying unit 112, and providing unit 113 shown in FIG. 5, by executing a program.

Acquiring unit 111 acquires send data transmitted from wireless terminal 400, via communication unit 130. Acquiring unit 111 is capable of acquiring send data from plural wireless terminals 400 possessed by plural users. Send data is data including at least identification data. Send data may also include date and time data, location data (described later), and a message.

Classifying unit 112 classifies wireless terminal 400 whose send data has been acquired by acquiring unit 111. Classifying unit 112 classifies wireless terminal 400 into any one of multiple communities (namely, groups) based on identification data included in send data. Classifying unit 112 may make the classification based not only on identification data but also on location data. Classifying unit 112 classifies wireless terminal 400 with reference to APDB 200.

Providing unit 113 provides communication unit 130 with distribution data addressed to wireless terminal 400. Providing unit 113 generates or acquires distribution data for wireless terminal 400, which has been classified into any one of multiple communities by classifying unit 112, which data corresponds to the community, and provides the distribution data to communication unit 130. Providing unit 113, for example, generates distribution data including a message included in send data. Alternatively, providing unit 113 may acquire distribution data from storage unit 120, and provide the distribution data to communication unit 130. In that case, storage unit 120 stores distribution data that has been prepared in advance, for example, by an event organizer.

Providing unit 113 is capable of providing distribution data with a certain restriction, or of distributing distribution data with a certain (intended) time lag, as described later.

The foregoing is a description of a configuration of information distribution system 10. According to the system, a user of wireless terminal 400 attends an event at a certain place. For example, a user goes to a concert hall to attend a concert. At the place, a plurality of users not all of whom are known to each other, are present.

AP 300 is provided at such a place. AP 300 continually sends a radio signal during an event. If a user comes within a range of the radio signal, wireless terminal 400 receives the radio signal. When wireless terminal 400 receives the radio signal, a user is allowed to participate in a community, which corresponds to AP 300 whose radio signal was received. For example, in the above case of an event at a concert hall, a user is allowed to participate in a community for the concert hall or a community featuring a musician performing at the concert hall. On the other hand, a user of wireless terminal 400, which has not received a radio signal, is not allowed to participate in a community to which the radio signal corresponds.

Figure 6:
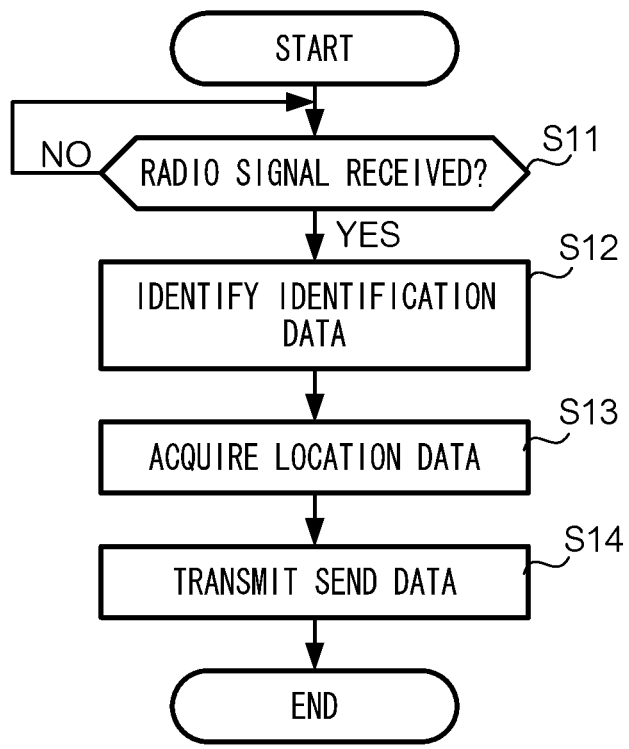
FIG. 6 is a flowchart showing a processing procedure performed by a wireless terminal.

FIG. 6 is a flowchart showing a processing procedure performed by wireless terminal 400. The processing procedure is performed when a user inputs an instruction to start a predetermined application, and it is executed by control unit 410 of wireless terminal 400. Control unit 410 initially determines whether a radio signal has been received from AP 300 via first communication unit 430 (step S11). Control unit 410 repeats the determination until it succeeds in receiving a radio signal. If control unit 410 succeeds in receiving a radio signal, it identifies identification data of AP 300 (step S12).

Subsequently, control unit 410 causes positioning unit 470 to perform positioning to acquire location data (step S13). It is to be noted that control unit 410 may acquire location data at another time, such as when executing the application (namely, before a radio signal is received). However, it is preferable that the difference between a time of acquiring location data and a time of receiving a radio signal is smaller.

After the identification data and the location data are acquired, control unit 410 provides second communication unit 440 with send data to cause second communication unit 440 to transmit the send data (step S14). The send data includes the identification data, the location data, and date and time data. Control unit 410 includes date and time data in the send data, which indicates a date and time at which the send data is transmitted.

Figure 7:
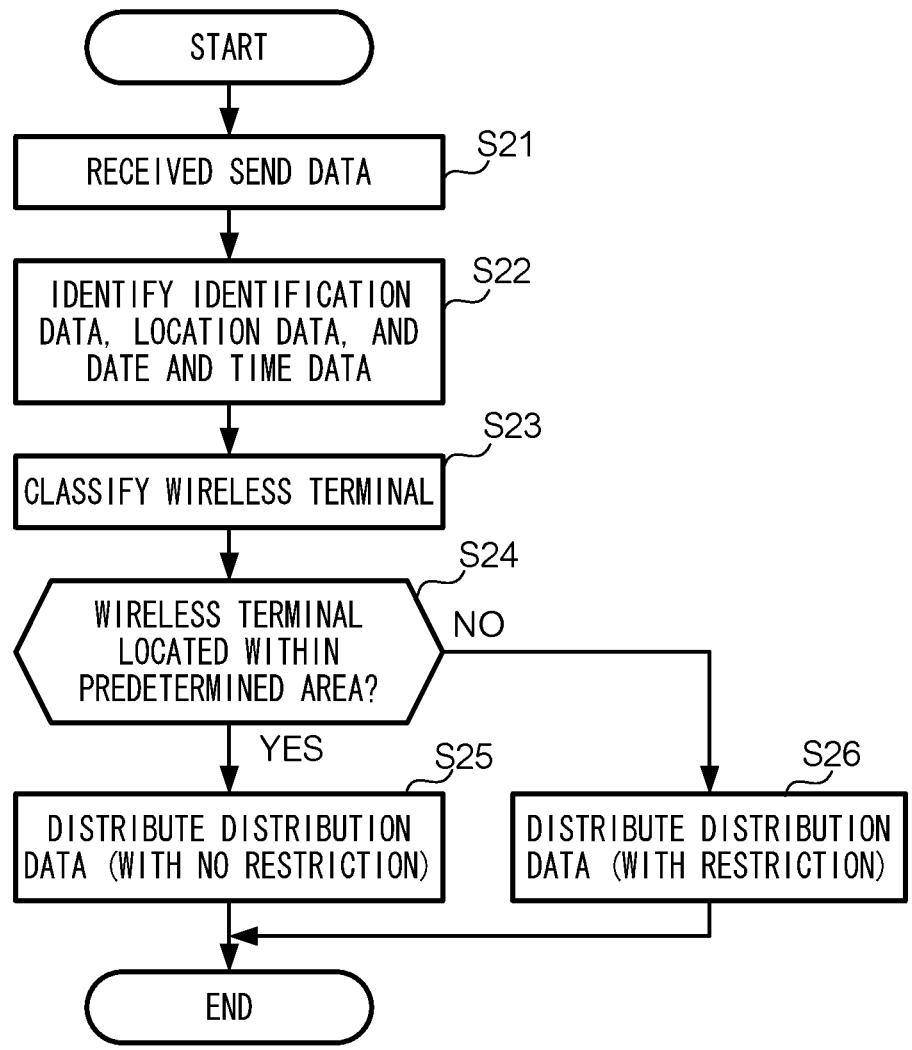
FIG. 7 is a flowchart showing a processing procedure performed by an information distribution apparatus.

FIG. 7 is a flowchart showing a processing procedure performed by information distribution apparatus 100, which has received the send data. After the send data is received by information distribution apparatus 100, control unit 110 of the apparatus acquires the send data (step S21) to identify the identification data, the location data, and the date and time data, which are included in the send data (step S22). Subsequently, control unit 110 classifies wireless terminal 400, which transmitted the send data, into any one of communities with reference to APDB 200 (step S23). When doing so, control unit 110 makes the classification based on the identification data and the location data, which were identified at step S22.

Subsequently, control unit 110 determines whether a location indicated by the location data identified at step S22 is within a predetermined area including a location at which AP 300 is installed (step S24). In other words, control unit 110 determines whether wireless terminal 400, which was classified into a community at step S23, is located near AP 300, which corresponds to the community. The determination is based on a comparison of location data stored in APDB 200 (see FIG. 2) and the location data identified at step S22.

The predetermined area may be different for each facility, or may be common to all facilities. The predetermined area is, for example, "an area within a 500-meter radius from the place of installation of AP 300." The area may be determined based on the size of a cell (a range of a radio signal) of AP 300, or may be determined regardless of the size of a cell.

Figure 8:
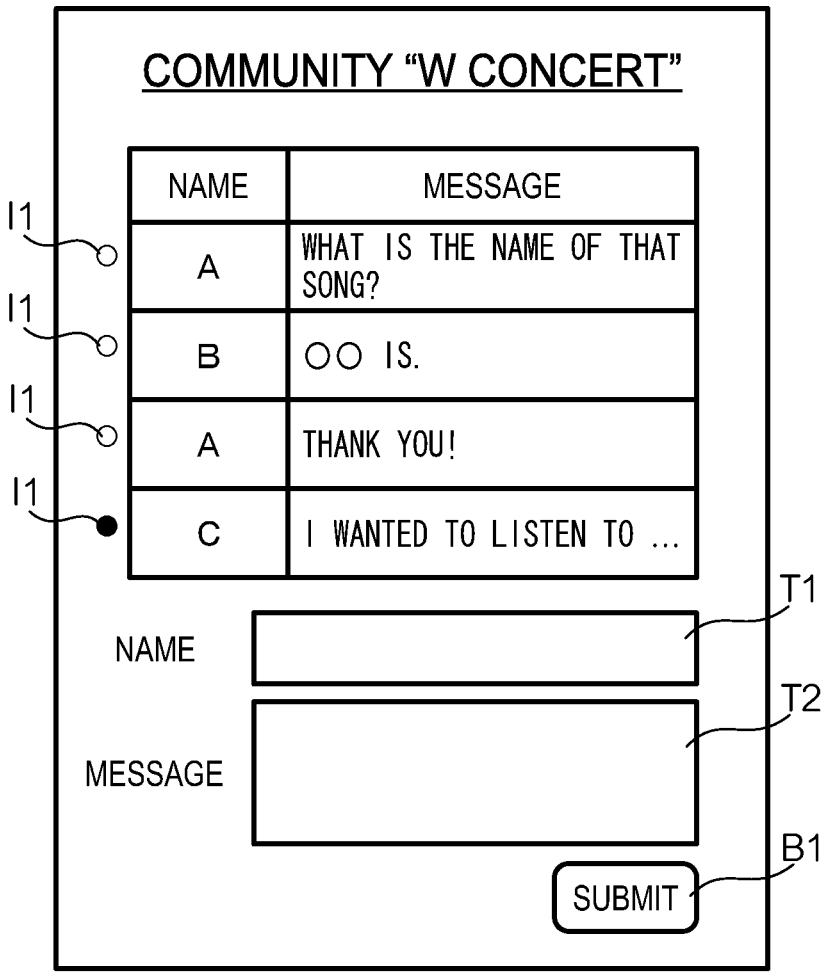
FIG. 8 is a diagram showing an example of a display of distribution data.

If the location indicated by the location data is within the predetermined area, control unit 110 distributes distribution data with no restriction (step S25). If the location is not within the predetermined area, control unit 110 distributes distribution data with a restriction (step S26). The restriction may be modification to distribution data. For example, control unit 110 may limit the number of submissions of messages by a user to a predetermined number. Alternatively, control unit 110 may limit confidentiality of user information (anonymity). Specifically, control unit 110, for wireless terminal 400 for which a location indicated by location data is within a predetermined area, may not disclose a location of a user of the terminal to other users, whereas control unit 110, for wireless terminal 400 for which a location indicated by location data is not within a predetermined area, may disclose a location of a user of the terminal to other users FIG. 8 is a diagram showing a display example of the distribution data. After receiving the distribution data, wireless terminal 400 causes display unit 450 to display an image such as that shown in FIG. 8. The display example shown in FIG. 8 assumes a case where, in a concert performed by a musician, users belonging to a community exchange messages.

In the display example, text box T1 is for inputting a name. Text box T2 is for inputting a message. Information input to the text boxes is reflected in distribution data so that other users are able to see the information. A name input to text box T1 may be an online name (a false name or an alias) or a real name, according to a user's preference. A user selects submit button B1 after inputting a name and a message.

Notification icons I1 are icons indicative of a result of the determination made in step S24. Specifically, notification icons I1 indicate whether a user who has submitted a message is located near the place at which the event is held (in the predetermined area). In the display example, users "A" and "B," for which notification icon I1 is a white circle, are located near the place at which the event is held. User "C," for which notification icon I1 is a black circle, is not located near the place. By this indication, a user is able to differentiate a user who is actually located at the place at which the event is held from a user who is not located at the place (for example, a user who has left the event early).

When wireless terminal 400 receives an input operation to select submit button B1, wireless terminal 400 transmits send data to information distribution apparatus 100. When doing so, wireless terminal 400 includes the name and the message input by a user in the send data. The send data includes identification data and location data, as in the case of send data described with reference to FIG. 6.

When information distribution apparatus 100 receives the send data, the apparatus updates distribution data for a corresponding community. Specifically, information distribution apparatus 100 includes the received message in distribution data for the community. Subsequently, information distribution apparatus 100 distributes the updated distribution data to wireless terminals 400 of all users belonging to the community. Accordingly, wireless terminal 400, once any one of users belonging to a community, to which a user of wireless terminal 400 belongs, submits a message, even if s/he is not a user of wireless terminal 400, displays the message substantially in real time. It is preferable that a user is able to select by an input operation whether a newly submitted message is displayed.

When a restriction through distribution data is imposed, for example, none of text boxes T1 and T2 and submit button B1 may be displayed. For example, information distribution apparatus 100 may distribute distribution data to wireless terminal 400 of a user, who is not located within a predetermined area including a place where an event is held, by which data none of text boxes T1 and T2 and submit button B1 is displayed; thus, the user not within the predetermined area is not able to submit a message. Alternatively, information distribution apparatus 100 may count a number of submissions of a message by a user, and if the number exceeds a predetermined threshold (for example, five times), information distribution apparatus 100 may prohibit the user from submitting a message. Alternatively, a number of characters per message may be limited, or a change of a name may be prohibited.

Distribution data is not limited to data including a message sent by a user. Information distribution apparatus 100 may distribute a message (a variety of notices such as notes) from an event organizer as distribution data. Alternatively, information distribution apparatus 100 may distribute distribution data that includes a message of a user belonging to a community and a message of an event organizer.

When a predetermined time is reached (for example, when an event has terminated), information distribution apparatus 100 stops distributing distribution data to users belonging to communities for the event. Namely, information distribution apparatus 100 terminates the service. In a case where a new event is held, information distribution apparatus 100 creates communities for the event, and starts distributing distribution data to users belonging to the communities.

As described in the foregoing, according to information distribution system 10, a user is able to participate in a community specific to a location simply by going to the location, and to submit and browse messages. A user is not required to register information in advance. Persons with whom a user is able to communicate are not limited to friends or relatives with whom the user has existing relations. Accordingly, a user is able easily to participate in a community, without disclosing his/her identity. Information distribution system 10 is expected to promote communication.

A community of the present embodiment is characterized in that it is temporary. A user in such a community is able to submit his/her honest feeling or candid opinion, which is not possible unless the community is temporary, without taking consequences into consideration.

Further, a community of the present embodiment is characterized in that it is formed by users who are associated with a particular location, not randomly selected users. Users who gather at a particular place (or users who have gone to the place) tend to have a common disposition or characteristic, as described above. For example, users who gather at a concert hall are likely to be music lovers. Further, users who gather at a concert hall where musician performs a concert are likely to be not only music lovers, but also fans of the performing musician. According to information distribution system 10, users having a hobby, preference, or habit in common are associated, and thus provided with an opportunity to communicate.

A community of the present embodiment is not limited to the above example. A community may be a community of users who gather at a bookshop or a restaurant, or a community of users who gather in a smoking area. In a case where users who gather at a particular store are associated, a community of fans of the store may be formed, or a community of customers and staff of the store (with their identities hidden) may be formed. If AP 300 is installed on a train, a bus, or a ship, a community of passengers may be formed.

[Modifications]

The present invention may be implemented in an embodiment different from the above embodiment. For example, the present invention may be implemented in embodiments shown by the following modifications or a combination of any one or more thereof.

(1) According to the present invention, use of location data is not essential. Information distribution apparatus 100 may distribute distribution data to only wireless terminal 400, which is actually receiving a radio signal, and may not distribute distribution data to wireless terminal 400, which is not receiving a radio signal. In such a case, a community is formed by only users of wireless terminals 400, which are located within a cell of AP 300, only when a radio signal is received by the wireless terminals 400. In the case where distribution data is distributed to only wireless terminal 400 located within a cell of AP 300, information distribution apparatus 100 may send distribution data to AP 300 to be distributed to wireless terminal 400 via AP 300.

Alternatively, information distribution apparatus 100 may distribute distribution data with no restriction to wireless terminal 400, which is actually receiving a radio signal, and distribute distribution data with a restriction to wireless terminal 400, which has received a radio signal previously and is currently not receiving a radio signal (namely, wireless terminal 400 that has previously been in a cell of AP 300, and currently is not therein). Distribution data with a restriction may be distribution data by which messages can be browsed while a message cannot be submitted.

(2) A positioning method in the present invention is not limited to a method using a GPS. A positioning method in the present invention may be a method using a location of a base station of a mobile communication network (base station positioning) or a method using a location of an access point of a wireless LAN. Alternatively, location data stored in a location register of a mobile communication network may be used as location data of wireless terminal 400.

(3) In data distribution of the present invention, a submitted message is displayed in wireless terminals 400 substantially in real time, as described above. However, in a case where a submitted message is displayed substantially in real time, and users are in a relatively narrow space such as a room, a user who has submitted a message may be identified. If there is a user in a space who operates wireless terminal 400 to input a message, and a new message is displayed immediately after the user's operation is completed, it may be obvious to other users that the user has submitted the message.

To solve the problem, information distribution apparatus 100 may distribute distribution data including a message with a predetermined time lag (in other words, delay). Due to the time lag, it becomes difficult to associate a submitted message and a user who has submitted the message, as compared with a case in which no time lag is provided. A length of a time lag may be fixed or set by a user.

Figure 9:
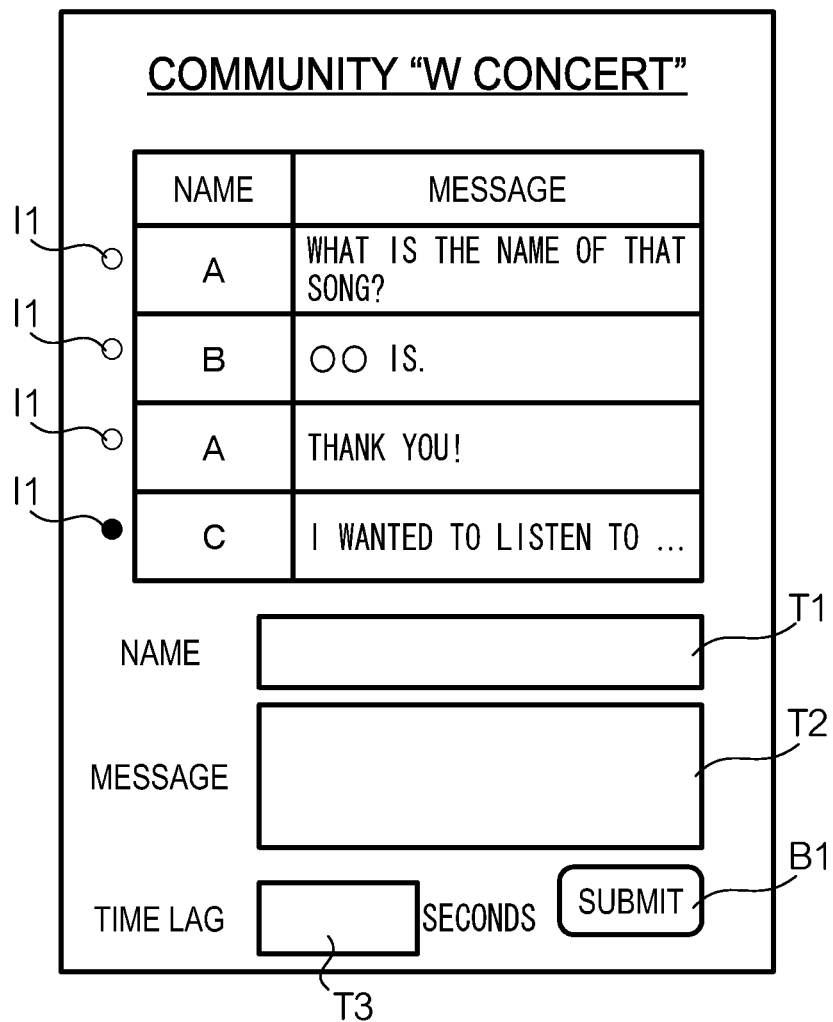
FIG. 9 is a diagram showing a display example of distribution data.

FIG. 9 is a diagram showing a display example of distribution data by which a time lag is set by a user. The display example shown in the drawing is the same as that shown in FIG. 8 except that text box T1, to which a time lag is input, is included. A user inputs a desired value (time) to text box T1 to set a time taken until his/her message can be browsed by other users. Information distribution apparatus 100 that has received send data including such a value, delays distribution of distribution data according to the value.

(4) Radio equipment of the present invention is not limited to an access point of a wireless LAN. Radio equipment of the present invention may be Bluetooth™ compliant radio equipment or radio equipment using RFID (Radio Frequency Identification).

Radio equipment of the present invention may employ the same communication system as that used in a network with which a wireless terminal and an information distribution apparatus communicate. In such a case, a first communication unit (a means for receiving a radio signal) and a second communication unit (a means for transmitting send data) of a wireless terminal of the present invention may be provided in a single hardware device.

(5) Instead of an information distribution apparatus, a wireless terminal, or an information distribution system including them, the present invention may be embodied as a program, which is executed by an information distribution apparatus or a wireless terminal, or an information distribution method. The program may be provided in the form of a recording medium. Alternatively, the program may be downloaded to a computer via a network such as the Internet, and installed therein so that the program can be used.

What is claimed is:

1. An information distribution apparatus, comprising:
a receiving unit that receives identification data from each of a plurality of wireless terminals that have received a radio signal transmitted from one of a plurality of wireless devices, the plurality of wireless devices being installed at specified locations, and the received identification data being unique to the one of the plurality of wireless devices from which the wireless terminals have received a radio signal;
a classifying unit that classifies the plurality of wireless terminals into groups based on identification data received by the receiving unit, the groups being formed of a plurality of wireless terminals that have received a radio signal from a same wireless device; and
a distributing unit that distributes distribution data to a wireless terminal classified into a group by the classifying unit, the distribution data corresponding to the group,
wherein:
the receiving unit further receives location data indicative of a location of the wireless terminal; and
the distributing unit distributes distribution data with a predetermined restriction to one of the plural wireless terminals classified into groups by the classifying unit, the distribution data corresponding to a group into which the wireless terminal has been classified, when a location of the wireless terminal indicated by location data received by the receiving unit is not within a predetermined area including a location where the wireless device corresponding to the group is installed.

2. The information distribution apparatus according to claim 1, wherein the distributing unit distributes distribution data to a wireless terminal classified into a group by the classifying unit, the wireless terminal currently receiving a radio signal, the distribution data corresponding to the group, and the distributing unit distributes distribution data with a predetermined restriction to a wireless terminal classified into the group by the classifying unit, the wireless terminal having previously received a radio signal and not currently receiving a radio signal, the distribution data corresponding to the group.

3. The information distribution apparatus according to claim 1, wherein the classifying unit classifies the plural wireless terminals into different groups when dates and times at which the plural wireless terminals receive a radio signal are different, even if the plural wireless terminals have received a same radio signal.

4. The information distribution apparatus according to claim 1, wherein:
the receiving unit further receives a message submitted by a user of the wireless terminal; and
the distributing unit includes the message received from the wireless terminal in the distribution data corresponding to a group to which the wireless terminal belongs.

5. The information distribution apparatus according to claim 4, wherein the distributing unit distributes the message with a time lag set by the user who has submitted the message or with a predetermined time lag.

6. An information distribution method, comprising:
a first step of receiving identification data from each of a plurality of wireless terminals that have received a radio signal transmitted from one of a plurality of wireless devices, the plurality of wireless devices being installed at specified locations, and the received identification data being unique to the one of the plurality of wireless devices from which the wireless terminals have received a radio signal;
a second step of classifying the plurality of wireless terminals into groups based on identification data received at the first step, the groups being formed of a plurality of wireless terminals that have received a radio signal from a same wireless device; and
a third step of distributing distribution data to a wireless terminal classified into a group in the second step, the distribution data corresponding to the group,
wherein:
location data indicative of a location of the wireless terminal is received in the first step; and
distribution data with a predetermined restriction to one of the plural wireless terminals classified into groups in the second step is distributed in the third step, the distribution data corresponding to a group into which the wireless terminal has been classified, when a location of the wireless terminal indicated by location data received by the receiving unit is not within a predetermined area including a location where the wireless device corresponding to the group is installed.

7. A computer program residing in a non-transitory medium for causing a computer to execute:
a first step of receiving identification data from each of a plurality of wireless terminals that have received a radio signal transmitted from one of a plurality of wireless devices, the plurality of wireless devices being installed at specified locations, and the received identification data being unique to the one of the plurality of wireless devices from which the wireless terminals have received a radio signal;
a second step of classifying the plurality of wireless terminals into groups based on identification data received at the first step, the groups being formed of a plurality of wireless terminals that have received a radio signal from a same wireless device; and
a third step of distributing distribution data to a wireless terminal classified into a group in the second step, the distribution data corresponding to the group,
wherein:
location data indicative of a location of the wireless terminal is received in the first step; and
distribution data with a predetermined restriction to one of the plural wireless terminals classified into groups in the second step is distributed in the third step, the distribution data corresponding to a group into which the wireless terminal has been classified, when a location of the wireless terminal indicated by location data received by the receiving unit is not within a predetermined area including a location where the wireless device corresponding to the group is installed.

8. An information distribution apparatus, comprising:
a receiving unit that receives identification data from each of a plurality of wireless terminals that have received a radio signal transmitted from one of a plurality of wireless devices, the plurality of wireless devices being installed at specified locations, and the received identification data being unique to the one of the plurality of wireless devices from which the wireless terminals have received a radio signal;
a classifying unit that classifies the plurality of wireless terminals into groups based on identification data received by the receiving unit, the groups being formed of a plurality of wireless terminals that have received a radio signal from a same wireless device; and
a distributing unit that distributes distribution data to a wireless terminal classified into a group by the classifying unit, the distribution data corresponding to the group,
wherein the distributing unit distributes distribution data to a wireless terminal classified into a group by the classifying unit, the wireless terminal currently receiving a radio signal, the distribution data corresponding to the group, and the distributing unit distributes distribution data with a predetermined restriction to a wireless terminal classified into the group by the classifying unit, the wireless terminal having previously received a radio signal and not currently receiving a radio signal, the distribution data corresponding to the group.

9. An information distribution method, comprising:
a first step of receiving identification data from each of a plurality of wireless terminals that have received a radio signal transmitted from one of a plurality of wireless devices, the plurality of wireless devices being installed at specified locations, and the received identification data being unique to the one of the plurality of wireless devices from which the wireless terminals have received a radio signal;
a second step of classifying the plurality of wireless terminals into groups based on identification data received at the first step, the groups being formed of a plurality of wireless terminals that have received a radio signal from a same wireless device; and
a third step of distributing distribution data to a wireless terminal classified into a group in the second step, the distribution data corresponding to the group,
wherein the distribution data is distributed to a wireless terminal classified into a group in the second step, the wireless terminal currently receiving a radio signal, the distribution data corresponding to the group, and the distribution data is distributed with a predetermined restriction to a wireless terminal classified into the group in the second step, the wireless terminal having previously received a radio signal and not currently receiving a radio signal, the distribution data corresponding to the group.

10. A computer program residing in a non-transitory medium for causing a computer to execute:
a first step of receiving identification data from each of a plurality of wireless terminals that have received a radio signal transmitted from one of a plurality of wireless devices, the plurality of wireless devices being installed at specified locations, and the received identification data being unique to the one of the plurality of wireless devices from which the wireless terminals have received a radio signal;

a second step of classifying the plurality of wireless terminals into groups based on identification data received at the first step, the groups being formed of a plurality of wireless terminals that have received a radio signal from a same wireless device; and a third step of distributing distribution data to a wireless terminal classified into a group in the second step, the distribution data corresponding to the group, wherein the distribution data is distributed to a wireless terminal classified into a group in the second step, the wireless terminal currently receiving a radio signal, the distribution data corresponding to the group, and the distribution data is distributed with a predetermined restriction to a wireless terminal classified into the group in the second step, the wireless terminal having previously received a radio signal and not currently receiving a radio signal, the distribution data corresponding to the group.

* * * * *